(12) United States Patent
Lee et al.

(10) Patent No.: US 9,525,193 B2
(45) Date of Patent: Dec. 20, 2016

(54) POWER MANAGEMENT SYSTEM FOR AIRCRAFT CONTAINER TRACKING DEVICE

(71) Applicant: Senaya, Inc., Framingham, MA (US)

(72) Inventors: Brian Lee, Boston, MA (US); Mrinmoy Chakraborty, Bangalore (IN); Jamshed Dubash, Shrewsbury, MA (US); Jahangir Nakra, Titusville, NJ (US); Dadi Setiadi, Edina, MN (US)

(73) Assignee: Senaya, Inc., Framingham, MA (US)

( * ) Notice: Subject to any disclaimer, the term of this patent is extended or adjusted under 35 U.S.C. 154(b) by 73 days.

(21) Appl. No.: 14/178,472

(22) Filed: Feb. 12, 2014

(65) Prior Publication Data

US 2014/0235188 A1 Aug. 21, 2014

Related U.S. Application Data

(60) Provisional application No. 61/765,326, filed on Feb. 15, 2013.

(51) Int. Cl.
| | |
|---|---|
| *H04B 17/00* | (2015.01) |
| *H04W 24/00* | (2009.01) |
| *H04W 52/02* | (2009.01) |
| *H01M 10/46* | (2006.01) |
| *H02J 7/35* | (2006.01) |

(52) U.S. Cl.
CPC ....... *H01M 10/465* (2013.01); *H01M 2220/00* (2013.01); *H02J 7/355* (2013.01)

(58) Field of Classification Search
CPC ............. H04Q 7/20; H04B 1/40; H04B 17/00; H04B 17/10; H04W 4/02; H04W 52/00; H04W 52/02; H04W 52/0251

USPC ................. 455/414.1, 456.1, 456.6
See application file for complete search history.

(56) References Cited

U.S. PATENT DOCUMENTS

| | | | |
|---|---|---|---|
| 6,281,797 B1 | 8/2001 | Forster et al. | |
| 6,734,796 B2 | 5/2004 | Forster et al. | |
| 7,072,668 B2 * | 7/2006 | Chou | G01S 5/0027 342/357.4 |
| 7,501,944 B2 | 3/2009 | Hyde | |
| 7,791,455 B1 | 9/2010 | MacLean, III et al. | |
| 8,930,721 B2 * | 1/2015 | Chin | G06F 1/263 713/300 |

(Continued)

OTHER PUBLICATIONS

U.S. Appl. No. 14/038,341, "Pattern Recognition Based Motion Detection for Asset Tracking System," filed Sep. 26, 2013, United States Patent and Trademark Office.

(Continued)

Primary Examiner — Blane Jackson
(74) Attorney, Agent, or Firm — Holzer Patel Drennan

(57) ABSTRACT

An RF asset tracking device for cargo containers that has an extended operational life, due to a power management system and multiple power sources. The device has a solar cell and high capacity supercapacitor as a principal power source and a rechargeable battery as an auxiliary power source. Control circuitries manage and regulate the usage of the primary and secondary sources. Together, these power sources provide sufficient power for the tracking device to operate for an extended period of time, thus increasing the period between needed maintenance and decreasing downtime and thus cost.

19 Claims, 3 Drawing Sheets

(56) References Cited

U.S. PATENT DOCUMENTS

| | | | |
|---|---|---|---|
| 2006/0281435 A1* | 12/2006 | Shearer | G06K 19/0707 |
| | | | 455/343.1 |
| 2012/0252488 A1* | 10/2012 | Hartmann | G06Q 10/08 |
| | | | 455/456.1 |
| 2013/0157729 A1* | 6/2013 | Tabe | H04W 52/0245 |
| | | | 455/573 |
| 2013/0321122 A1 | 12/2013 | Lee et al. | |
| 2013/0321211 A1 | 12/2013 | Chakraborty et al. | |
| 2013/0324059 A1 | 12/2013 | Lee et al. | |
| 2013/0324151 A1 | 12/2013 | Lee et al. | |
| 2013/0324152 A1 | 12/2013 | Lee et al. | |
| 2014/0018023 A1 | 1/2014 | Lee et al. | |

OTHER PUBLICATIONS

U.S. Appl. No. 14/140,330, "Methodology to Extend Battery Power in Asset-Tracking Device", filed Dec. 24, 2013, United States Patent and Trademark Office.

U.S. Appl. No. 14/140,304, "Method and Apparatus for Activation and Deactivation of Aircraft Container Tracking Device", filed Dec. 24, 2013, United States Patent and Trademark Office.

* cited by examiner

POWER MANAGEMENT SYSTEM FOR AIRCRAFT CONTAINER TRACKING DEVICE

CROSS-REFERENCE TO RELATED APPLICATION

This application claims the benefit of U.S. Provisional Application No. 61/765,326 filed Feb. 15, 2013, the entire contents of which are incorporated herein by reference for all purposes.

FIELD OF THE DISCLOSURE

The present disclosure is directed to wireless asset tracking devices and systems. More particularly, the present disclosure is directed to features configured to extend the battery life of the tracking device.

BACKGROUND

Many freight logistic companies attach tracking devices to airline containers to track their geographic location. This allows the logistic company to determine the geographic location of the container as it moves between the origination and destination point(s), to determine whether the goods inside the container are on time, late, or somehow misplaced. For example, by tracking the movement of the container, the logistic company will quickly know if the container has been misrouted or been placed on the incorrect transport. The advantages of tracking the position of the goods are many and therefore asset tracking has become commonplace throughout the shipping industry.

The tracking devices associated with the container transmit and receive various types of communication signals for determining the geographic position of the tracking device and thus the container. A problem occurs when the tracked container is loaded onto a transportation vessel, such as an aircraft, as the communication signals may potentially cause interference with the vessel systems. Regulatory agencies, such as the Federal Aviation Administration (FAA), place restrictions on communications signals due to their potential interference with flight systems and communications. Therefore it is necessary that the tracking device be deactivated when the cargo container is on board an aircraft.

The experience has been that it is inadequate to rely on a manual switch to deactivate the tracking device when the container is placed on the aircraft. For instance, human operators may merely forget to deactivate the tracking device. Additionally, these containers are normally tightly packed into the transportation vessel cargo hold in such a manner that they are not easily accessible once the container has been placed in the hold, and even less accessible if the hold has been completely loaded. One container with a tracking device still activated that is loaded onto a transportation vessel may require that the entire transportation vessel be unloaded to access and deactivate the tracking device.

Additionally, manual switches are also inconvenient if they have been properly deactivated, for after the container is removed from the transportation vessel at the end of its journey, the tracking device must be reactivated so the container can again be adequately tracked.

In addition to requiring activation and deactivation on a regular basis, aircraft cargo tracking devices need to have long operation or life. Because the devices travel around the world, it may be an extended period of time before the device is at a location that is equipped to service the battery that operates the tracking device.

SUMMARY

The present disclosure provides an asset tracking device for cargo containers that has an extended operational life, thus increasing the duration between battery replacement or maintenance. The asset tracking device is provided with a power management system and with multiple power sources. Together, these power sources provide sufficient power for the tracking device to operate for an extended period of time, thus increasing the period between needed maintenance and decreasing downtime and thus cost.

The device has a solar cell and high capacity supercapacitor as a principal power source and a (rechargeable) battery as an auxiliary power source. Control circuitries manage and regulate the usage of the primary and secondary sources.

This disclosure provides, in one particular embodiment, a wireless RF transmitter device having a GPS positioning element, an RF communication module having an RF operating frequency, the operating frequency having an operating wavelength, a primary power source comprising a solar cell and a supercapacitor, a secondary power source comprising a battery, and a power management system operably connected to the primary power source and the secondary power source.

In another particular embodiment, this disclosure provides a wireless RF transmitter device having a GPS positioning element, a sensor array comprising at least one motion sensor and at least one machine vision sensor, an RF communication module and a cellular communication module, each configured to deactivate and activate based on data detected by the sensor array, a primary power source comprising a solar cell and a supercapacitor, a secondary power source comprising a battery, and a power management system operably connected to the primary power source and the secondary power source.

The tracking devices can be housed or present in an enclosure constructed with a structure that allows passage of visible light (UV) and RF signal therethough. Such a structure can be a perforated metallic material with aperture centers spaced apart uniformly by less than half the wavelength of the RF energy to be passed therethrough, or, by a periodic pattern of slits in the metallic material.

These and various other features and advantages will be apparent from a reading of the following detailed description.

BRIEF DESCRIPTION OF THE DRAWING

The disclosure may be more completely understood in consideration of the following detailed description of various embodiments of the disclosure in connection with the accompanying drawing, in which.

DISCUSSION OF THE INVENTION

Figure 1:
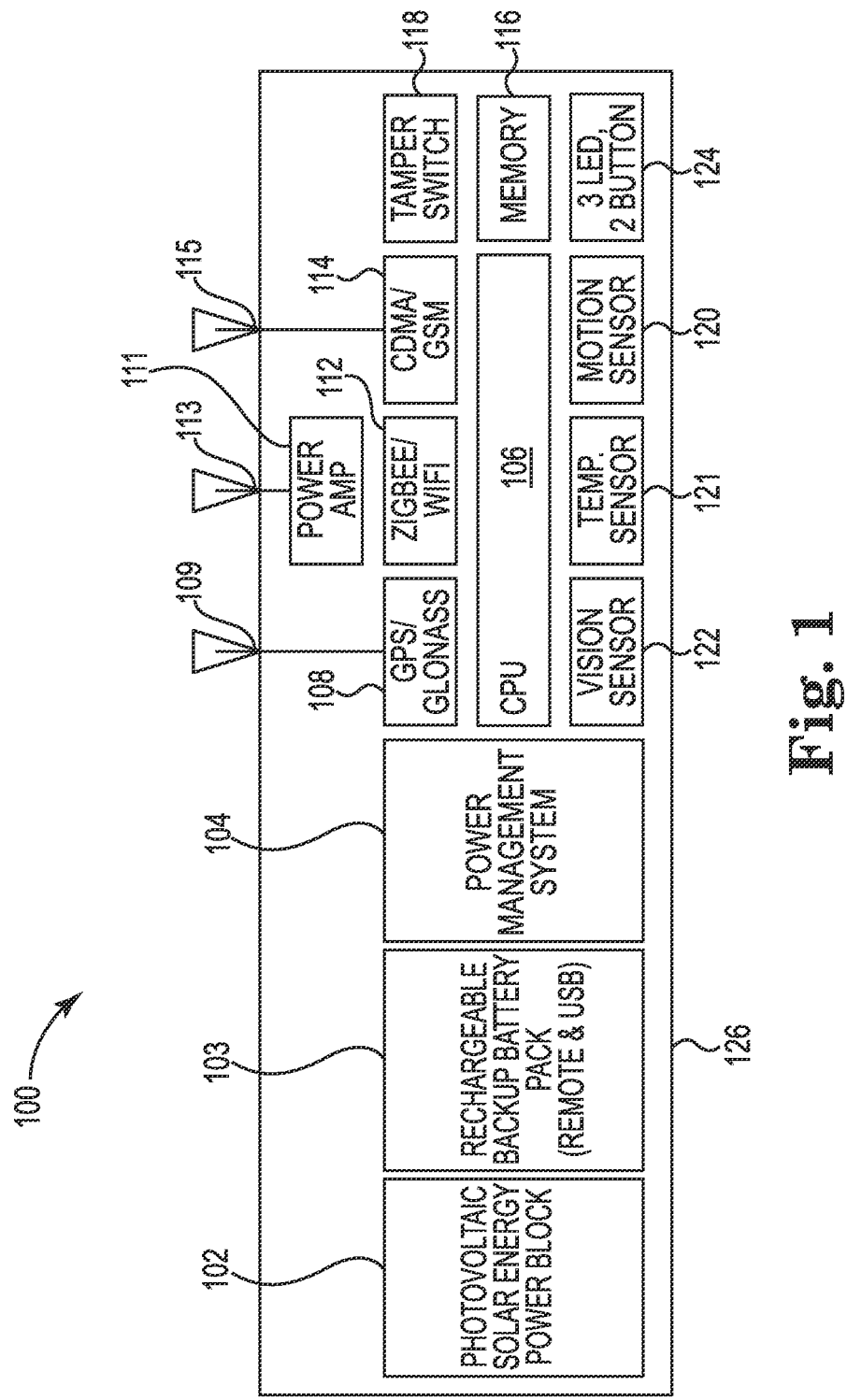
FIG. 1 is a schematic block diagram of a wireless tracking device.

In the following description, reference is made to the accompanying drawing that forms a part hereof and in which are shown by way of illustration at least one specific embodiment. The following description provides additional specific embodiments. It is to be understood that other embodiments are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

A wireless tracking system is highly beneficial in knowing the physical location of an asset at a set point in time. A "tracking system" and variations thereof includes at least one tracking or transmitter device, and a receiver for receiving the location signal from the tracking transmitter device(s). A "tracking device," "transmitter device," and variations thereof, is a signal emitting device configured for placement in or on an asset to be tracked, such as a container of goods.

Tracking is particularly beneficial for aircraft cargo, as it is not uncommon for cargo to be moved several times prior to be loaded on to the aircraft for its transport. Additionally, unlike over-the-road cargo, which can be quickly retrieved if placed on the wrong truck, an aircraft cargo container, if loaded on the wrong aircraft, will typically not be retrieved for an extended time period, because typically the aircraft will not be recalled or make an unscheduled landing merely because of one erroneously loaded container. When at the incorrect destination, the container will have to wait to find a return flight or an alternate flight to its desired destination. Because of the larger possibility of lost aircraft cargo containers, it is particularly desirable to know the immediate location of these containers.

As indicated above, the present disclosure provides an asset tracking system for cargo containers. The asset tracking device of the system has a power management system and multiple power sources that provide the device with extended operation time, thus increasing the period between needed maintenance and decreasing downtime and thus cost.

Prior to this invention, asset tracking devices were either powered by an AC main power source, optionally with a rechargeable battery, or by a DC main power battery (the battery being rechargeable or single use). These devices, in general, have short life span and a high maintenance cost. Conversely, the asset tracking device of this disclosure, having a power management system and multiple power sources, has a longer operational life and lower maintenance costs.

Aircraft transport is a highly common mode of transport for cargo containers, and because most airplanes fly across countries where basic cellular infrastructure may vary from CDMA to GSM to 2G to 4G cellular, the tracking device is preferably configured to operate on a global basis regardless of cellular infrastructure. In some embodiments, the tracking device features LTE communication device(s) with a global roaming SIM card to realize true global operations to support GSM, CDMA, and other mobile environment seamlessly. The communication device(s) provide long range and bi-directional wireless communication and cellular communication; both technologies are technically mature and have global coverage. The tracking device also includes an internal antenna system to transmit and receive communication signals. Further, because of possible changes in the route and future business environment, in some embodiments, the device requires no infrastructure such as WiFi routers and/or relays in each destination (e.g., airport).

The container-tracking device is equipped with a location system such as a GPS/GLONASS system, and a communication system that can include ZigBee, WiFi, and CDMA/GSM communication device. The tracking device can be equipped with sensors, such as vision sensors (e.g., primary and secondary), a temperature sensor and motion sensors. A tamper switch, and indicators such as 3 LED and 2 buttons can be part of the tracking device. The tracking device includes a computer processor (e.g., a 16 bit MCU) and non-volatile memory (NVM).

The tracking devices of this invention are ZigBee and/or WiFi enabled providing communication with WiFi and ZigBee routers/receivers. ZigBee and/or WiFi are used as a communication mechanism to send data (ping) between the tracking device and the router. In most situations, the tracking device is constantly in a listening mode. The router/receiver constantly broadcasts a beacon with secure encrypted signature packets that only the tracking device can decode and understand. When the tracking device comes within range of a router's beacon, it decodes the beacon signature. If the signature is correctly decoded, it wakes up and, using secure encrypted packets, broadcasts back its unique ID along with other sensory information (as well as historical information that the tracking might have gathered in its travels including GPS/GLONASS location should the tracking device be so enabled). If the router/receiver receives the secure information from the tracking device, and can decode the information, it sends a specific handshake packet back to the tracking device indicating successful receipt of the information.

Because the tracking device must be able to be powered in all environments (e.g., high humidity, low temperatures, high temperatures, etc.), the device of this disclosure has a primary and secondary power source, so that the tracking device does not rely on an AC main power, as in a fully battery-powered device. The power system provides enough power to operate the tracking device without needing any replacement or maintenance for at least one year, in some embodiments at least 18 months. The physical placement, dimensions, and combination of the power system are optimized for overall performance, and for operation under harsh environmental requirements.

FIG. 1 illustrates one embodiment of a tracking or transmitter device 100 that, together with a router/receiver (not shown), forms a tracking system. The particular device 100 is configured for use on an aircraft or in another location that must comply with FAA regulations; tracking device 100 has automatic on-off capabilities during transit in order to comply with FAA regulations, and utilizes both RF and cellular communication modes. Transmitter device 100 deactivates and reactivates, and switches between RF and cellular communication networks, depending on the status of the aircraft, in compliance with FAA regulations and other regulatory requirements. For example, RF communications are not allowed, at least, during takeoff and landing and at cruise altitude, and cellular communications are not allowed during taxiing, takeoff, and at cruise altitude.

Device 100 includes a multi-source power source, having a primary power source 102 and a secondary power source 103. Primary power source 102 includes a photovoltaic solar cell block with high capacity supercapacitor, and secondary power source 103 is a rechargeable battery. Both sources 102, 103 are operably connected to a power management system 104.

The solar cell block may be a single solar cell or may be a plurality of cells, arranged in parallel or in series. Electrically connected thereto is the high capacity supercapacitor, which could be a double-layer capacitor, a pseudocapacitor, or a hybrid capacitor.

Examples of suitable batteries for secondary power source 103 include NiCad, lithium, lithium-ion, zinc-carbon, and alkaline batteries. For example, a 3.7V battery could be used, although it is understood that other voltage batteries could be used. In addition to the solar power recharging batter 103, other power source rechargers or regenerators could be utilized, such as an inductive coil, a USB powerline, and mechanical energy harvesting mechanisms.

Electrically connected to power sources 102, 103 is power management system 104 that includes a battery level monitor and a power control, which in turn is operably connected to a computer chip or CPU 106. Power management system 104 manages and regulates the usage of the primary and secondary power sources 102, 103. For example, if the available power (e.g., current) from primary source 102 is low, power management system 104 may activate secondary power source 103, thus either supplementing or replacing the power being used from primary source 102. As another example, when primary source 102 has sufficient available power, yet the sun is shining, power management system 104 can authorize secondary power source 103 to draw power from primary source 102 and recharge.

In some embodiments, CPU 106 also manages primary and secondary power sources 102, 103. Additionally, CPU 106 activates and deactivates various elements of device 100, based on the status or location of device 100.

Transmitter device 100 also includes a positioning element, in this embodiment a GPS/GLONASS positioning element 108 connected to an antenna 109, which may be an internal antenna or an external antenna, and may be embedded into a housing encasing the elements of device 100. Antenna 109 may be, for example, a planar inverted F antenna, an inverted L antenna, or a monopole antenna. Antenna 109 may be a multi-band antenna, one that can transmit and receive signals in multiple frequency bands. Positioning element 108 provides data to transmitter device 100 regarding its physical location.

Transmitter device 100 transmits information or data, such as its location, in the form of a "ping" to the remote receiver via a wireless network, such as ZigBee and/or WiFi. In some embodiments, transmitter device 100 has two-way communication with the receiver. That is, transmitter device 100 transmits information (i.e., a ping) and also receives information from the receiver. Further, transmitter device 100 may receive instructions, such as to acknowledge that device 100 is active and ready and to transmit the location information. Having received those instructions, device 100 can send back to the receiver acknowledgement that the communication was received and acted on.

As indicated, the transmitter device is configured to send and optionally receive data via a wireless network. Device 100 of FIG. 1 is configured with a ZigBee/WiFi module 112 to connect to the receiver via a ZigBee network or a WiFi network and communicate data (e.g., position data). An alternate embodiment of a transmitter device can utilize a ZigBee/LBT module and a corresponding ZigBee/LBT network. Additionally, transmitter device 100 may include a data receiver (not shown), such as an infrared data link (IrDA), to provide a second communication means to device 100, as an alternate or back-up to module 112.

Device 100 also includes a cellular communication module 114, which may be CDMA (Code Divisional Multiple Access) and/or GSM (Global System for Mobile Communication) module, configured to connect to the receiver via either a CDMA or GSM network and communicate data to the receiver.

Modules 112, 114, respectively, have an antenna 113, 115, one or both of which may optionally include a power amplifier (e.g., power amplifier 111) to extend the range of the signal from modules 112, 114. In some embodiments, modules 112, 114 may be combined into a single physical module rather than two separate or distinct modules. Together, modules 112, 114 provide the communication basis for transmitter device 100 to the receiver. Module 112, which connects device 100 a wireless RF network, is utilized when FAA regulations allow use of RF communications, and module 114, which connects device 100 to a cellular network, is utilized when FAA regulations do not allow the use of RF communications yet do allow cellular communications.

Any of the data or information regarding device 100, such as its position as determined by positioning element 108, power level or usage information as determined by power management system 104, alarm information, etc., can be stored in a memory 116 of device 100, which may be a permanent memory or a rewritable, nonvolatile memory. Data from memory 116 may be transmitted to the receiver or may be retained in memory 116 until manually retrieved.

Transmitter device 100 includes an array of sensors to determine the location of device 100 in relation to an aircraft and to determine the status or mode of the aircraft, in order to determine when to activate and deactivate the device. The sensor array includes at least one motion sensor 120 and at least one machine vision sensor 122. In some embodiments, two vision sensors 122 are present.

Motion sensor(s) 120 can be, for example, a three-degree of freedom (DOF) device that has a 3-axis accelerometer or can be a six-degree of freedom (DOF) device that includes a 3-axis gyroscope and a 3-axis accelerometer. Other examples of suitable configurations for motion sensor 120 include a 9-DOF device that includes a 3-axis gyroscope, a 3-axis accelerometer and a 3-axis magnetometer, and a 10-DOF device that includes a 3-axis gyroscope, 3-axis accelerometer, 3-axis magnetometer, and an altitude sensor. Other embodiments of motion sensor(s) 120 may be used. With the various multiple degrees of freedom, device 100 can distinguish among various movements, orientations and locations, such as lateral motion, acceleration, inclined or declined motion, and altitude. With this information, device 100 can determine the aircraft's status, e.g., idle, taxiing, takeoff, cruising at altitude, landing, etc.

Vision sensor(s) 122 (e.g., a machine vision sensor) determine the curvature of the tagged container's surroundings, such as the interior wall of the cargo hold or the door of the cargo hold. With this information, tracking device 100 can determine whether it and the tagged container are inside a cargo hold or proximate to the door so that the tracking device can be deactivated.

Motion sensor(s) 120 can be used to wake up vision sensor(s) 122 and also to provide secondary information (e.g., lifting onto a conveyer, ramping onto an airplane, ascending, descending, landing, takeoff, touchdown, taxi, etc.) For situations when vision sensor(s) 122 may fail under extreme conditions, motion sensor(s) 120 act as a back up. For situations where motion sensor(s) 120 take over, the solar cell from the primary power source 102 can be used to detect light signals and determine the light source. The information from motion sensor(s) 120, vision sensor(s) 122, and from the solar cell is used for decision making during deactivation/reactivation of device 100, which is described in more detail below.

Device 100 may also include an indicator console 124 having various operational switches, gauges, buttons, and/or lights (e.g., LED lights); in the particular embodiment shown, indicator consul 124 has 3 LED lights and 2 buttons. Console 124 may include any number of optional features, such as an audio alarm to indicate any number of problems or malfunctions, such as low battery level, unauthorized movement (as sensed by motion sensor 120), or tampering with device 100 in any manner, as sensed by tamper switch 118. Device 100 may optionally include a temperature sensor 121.

The various elements that compose transmitter device 100 may be housed in an RF and/or cellular transmissive enclosure or housing 126, preferably one that is at least water resistant. Additional details regarding enclosure or housing 126 are provided below. In some embodiments, one or both of power sources 102, 103 may be physically removed from the rest of device 100. For example, the solar cell of primary power source 102 may be physically positioned separate from device 100 but electrically connected thereto.

Figure 2:
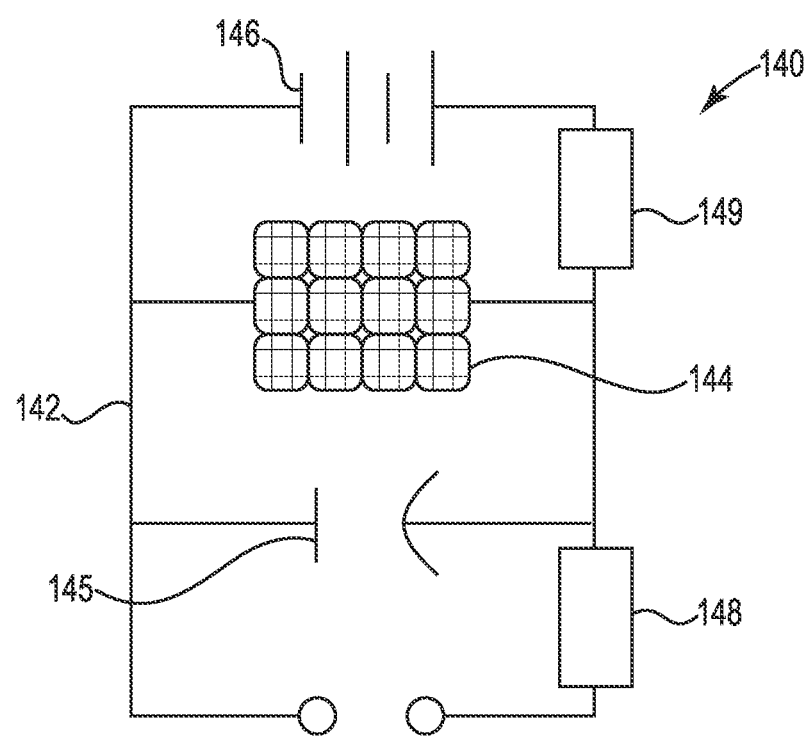
FIG. 2 is a schematic circuit diagram of a power management system.

FIG. 2 shows a schematic diagram of the power management scheme of tracking device 100. Power management system 140 has a circuit 142 connecting a specially designed solar cell 144, a high capacity supercapacitor 145 and a (rechargeable) battery 146. In the illustrated embodiment, all elements 144, 145 and 146 are arranged in parallel; other configurations could of course be used. Together, solar cell 144 and high capacity supercapacitor 145 are a principal power source (i.e., primary power source 102 from FIG. 1). A first control circuitry 148 senses current flowing from the principal power source, i.e., from solar cell 144 and supercapacitor 145. Circuitry 148 operates and manages system 140 under usual conditions. When circuitry 148 senses that sufficient power (current) is not available from solar cell 144 and supercapacitor 145, a second control circuitry 149 activates available power from battery 146. Together, control circuitries 148, 149 regulate the current from and voltage across system 140.

In system 140, (rechargeable) battery 146 is a back-up power source to solar cell 144 and supercapacitor 145, and is typically only activated when the principal power source (i.e., solar cell 144 and supercapacitor 145) is unable to provide enough current. Secondary control circuitry 149 manages the current from battery 146 so that it does not excess, or shortage. Control circuitry 149 also senses the power of battery 146, and warns tracking device 100 if battery 146 needs to be replaced or recharged, or is otherwise malfunctioning. Both first and second control circuitries 148, 149 also manage draining process of unused charge from system 140 at the end of life or as requested by the user, without recalling device 100 to a maintenance facility.

In addition to the power management system described above, with primary solar cell power source 102 and the secondary battery power source 103, additional battery charging techniques can be incorporated into device 100, such as the techniques disclosed in U.S. Patent Application Publication 2013/0324059 titled "Wireless Device with Hybrid Energy Charging," the entire disclosure of which is incorporated herein by reference.

All components of the power sources (e.g., of primary solar power source 102 (including solar cells 144 and supercapacitor 145), battery power source 103 (battery 146) and power management system 104) are environmentally friendly (e.g., RoHS, REACH, UN, UL, FM, FDA compliant). Additionally, they can operate at temperatures between −20° C. and 60° C. and can be stored at temperatures between −55° C. and 85° C.

For example, battery 146 is made from non-explosive, and non-toxic material; it has a low leakage current, a rated capacity between 500 mAh and 1000 mAh, and a long shelf life. High capacity supercapacitor 145 is also made from non-explosive and non-toxic material; it has a high energy density, high capacitance up to 100 Farads, a high peak current up to 1 A, low impedance (ESR), rapid charging and discharging; it has a long life (little or no degradation over hundreds of thousands of cycles, and not subject to the wear and aging). Solar cells 144 can be formed from semiconductor materials that meet RoHS, REACH, FIPS-140-2, CE, FM, FDA, UN, UL compliance, and that are some of the most benign materials. All control circuitry 148, 149 is also made of industrial grade semiconductor components, and thus considered benign.

Further, tracking device 100 and its power sources 102, 103 are IP67 compliant to protect against humidity and dust and will operate successfully during exposure to humidity between 30% and 95% RH and temperatures between −20° C. and 85° C.

As indicated above, device 100 can be particularly configured for tracking aircraft cargo; device 100 can be configured to activate and deactivate its various communication modules 112, 114 depending on the relation of device 100 to the aircraft and the status of the aircraft. In general, device 100 is configured to operate on RF communication when the container is outside of the aircraft, and either communicate via cellular or to be silent while in the aircraft, depending on the aircraft's status. For example, when the cargo container and device 100 are outside of an aircraft, device 100 transmits its data (e.g., the container's location) via an RF signal. As the container passes through a door into the aircraft cargo hold, the data is transmitted by a cellular signal. When the container is in the cargo hold, including during taxiing, flight, and landing, both RF module 112 and cellular module 114 deactivate. After flight, as the container passes through the door out from the aircraft cargo hold, device 100 transmits the data via a cellular signal. Once the container is outside of the aircraft, device 100 transmits the data via RF signal. Additional details regarding deactivating and reactivating device 100 based on its relation to an aircraft and the aircraft's status can be found in U.S. Patent Application Publication 2013/0321122 titled "Method and System for Airplane Container Tracking," which is incorporated herein by reference in its entirety.

Device 100 can be configured to have its data collection or ping event be event-based or time-based, or based on any other protocol. Examples of various event-based protocols, identified as SMART Ping™ events, such as described in U.S. Patent Application Publication 2013/0321211 titled "Asset Tracking System with Adjusted Ping Rate and Ping Period," U.S. Patent Application Publication 2013/0324151 titled "Asset Tracking System with Data Ping Based on Asset Movement," U.S. Patent Application Publication 2013/0324152 titled "Asset Tracking System Activated by Predetermined Pattern of Asset Movement," and U.S. patent application Ser. No. 14/038,341 filed Sep. 26, 2013 titled "Pattern Recognition Based Motion Detection for Asset Tracking System," all which are incorporated herein by reference in their entirety, can further be used to optimize power consumption. Another method, which stores multiple data points and sends it once, described in U.S. patent application Ser. No. 14/140,330 filed Dec. 24, 2013 titled "Methodology to Extend Battery Power in Asset-Tracking Device" and also incorporated herein by reference in its entirety, can additionally or alternately be used.

Device 100, with the power management system described herein, can be used in combination with sensors, positioned in or on the container, that provide information regarding the location of the container, particularly, if the container is proximate to, being loaded into, or already loaded in a transportation vessels, so that the tracking device can be deactivated so as to not interfere with the communications systems of the transportation vessel, such as an aircraft. Examples of tracking systems that include such sensors include those described in U.S. patent application Ser. No. 14/140,304 filed Dec. 24, 2013 titled "Method and Apparatus for Activation and Deactivation of Aircraft Container Tracking Device" and also incorporated herein by reference in its entirety.

Device 100 can be placed into or on a cargo container (either the exterior or interior). Alternately, device 100 may be formed into the wall of a cargo container, thus being integral with the container. No matter where or how installed, tracking device 100 is installed or attached in such a manner that it does not interfere with cargo handling equipment; this includes placement of transmitting device 100 and the power sources, if removed from the device, in a location such that neither the cargo handling equipment (e.g., fork truck or the like) nor a turbulent aircraft ride readily can damage the devices or power sources.

In optimum conditions, the transmission of RF signals and cellular signals, both to and from the device, is uninhibited. To collect as much energy as possible for tracking device 100, device 100, or at least the photovoltaic portion 102 of device 100, is exposed to visible light, either directly or through housing or enclosure 126.

For embodiments where tracking device 100 is mounted on the exterior of a cargo container, enclosure 126 of device 100 can be constructed from a shielded structure and material adapted to withstand severe environment conditions involving high thermal and mechanical stress while providing light (UV) and RF transparency. The UV transparency allows sufficient photons to reach photovoltaic device 102 to reliably power tracking device 100 and the RF transparency attenuates less transmitted/received cellular signals at specific frequency bands. Examples of suitable materials for enclosure 126 include polymeric materials such as polycarbonate and polyethylene. For embodiments where tracking device 100 is present in or on the interior of the cargo container, in addition to or alternately to enclosure 126 being transparent, the entire cargo container can be light (UV) and RF transparent or only a portion thereof, such as a window or one wall.

Figure 3:
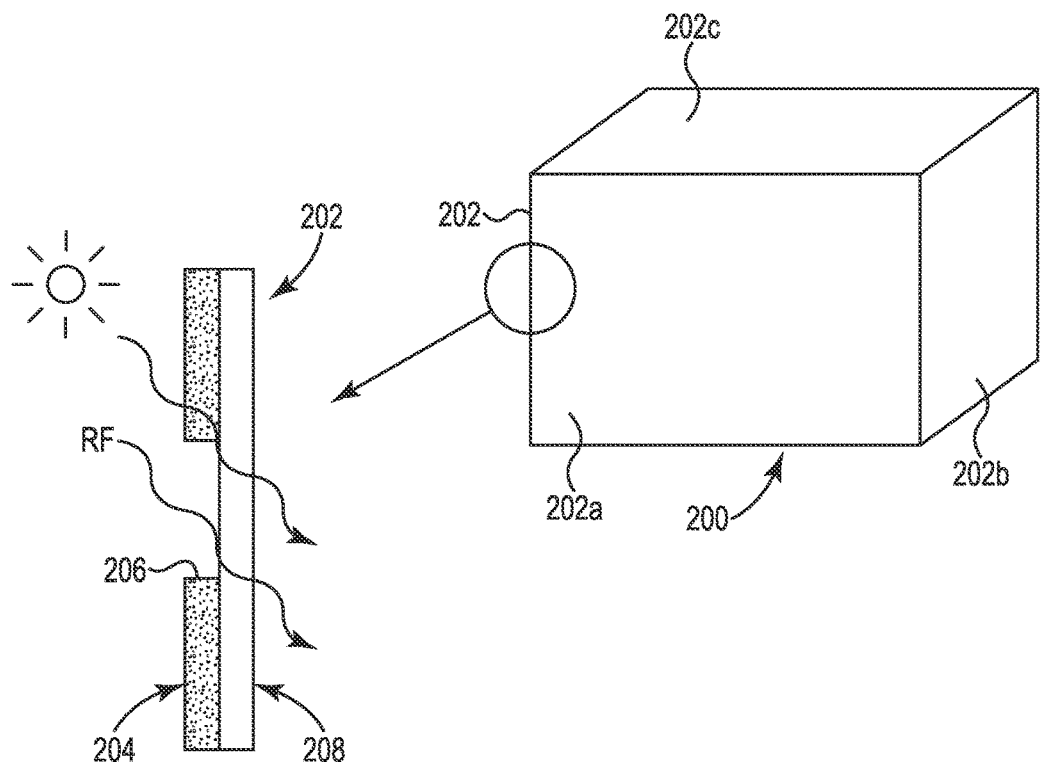
FIG. 3 is a schematic side view of an enclosure wall.
Figure 4:
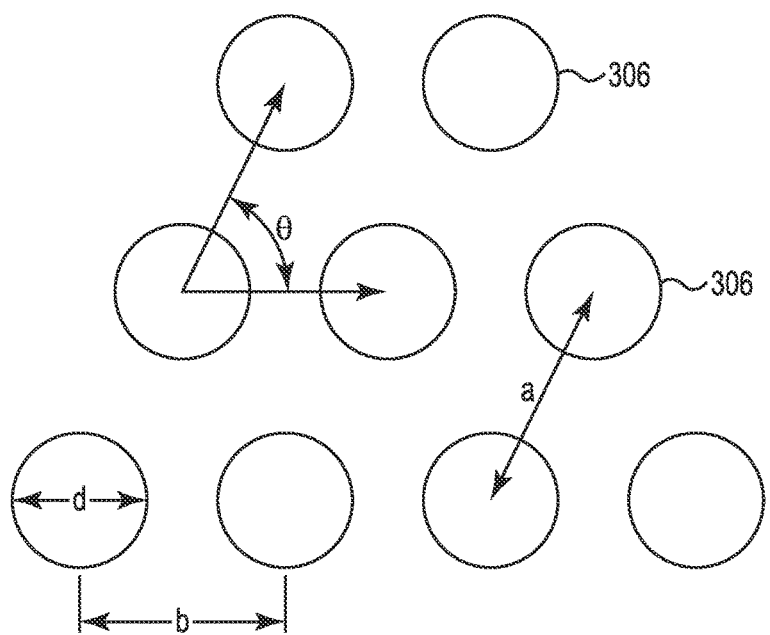
FIG. 4 is a depiction of a suitable aperture pattern for an enclosure wall.

A particular embodiment of a light (UV) and RF transparent structure that can be used for enclosure 126 or the cargo container is illustrated in FIGS. 3 and 4. The structure includes a perforated metallic material with a periodic pattern of apertures sandwiched with a glass or dielectric plate. The glass or dielectric plate not only provides structural support, but also is protective against severe environments.

Turning to FIG. 3, an enclosure 200 is shown formed from a perforated metallic material. Enclosure 200, in this embodiment, is a cuboid (rectangular) and includes a plurality of walls 202 (i.e., 202a, 202b, 202c, etc.), at least one of which includes the perforated metallic material. Enclosure 200 may be a cargo container or may be enclosure 126 of device 100.

Wall 202 is constructed from a metallic material 204 perforated with a periodic pattern of apertures 206 adjacent to a dielectric plate 208. Although not required, dielectric plate 208 is in contact with metallic material 204 and may be secured (e.g., adhered) thereto. The entire wall 202 may have the pattern of apertures 206 thereon, or only a portion of wall 202 may have apertures 206. Metallic material 204 can be any metal such as iron, steel (e.g., stainless steel), titanium, aluminum, copper, molybdenum, or brass. Metallic material 204 may be a metal alloy or an alloy of metal with a non-metallic material; for example, metallic material 204 may be a reinforced metal and/or composite material. In some embodiments, a highly electrical conductive metal such as copper, beryllium copper, or aluminum is desired for metallic material 204. The thickness of metallic material 204 is selected based on the dielectric constant of dielectric plate 208, the dimensions (e.g., diameter) of apertures 206, and the operating wavelength, since each of these parameters affect the equivalent electrical length of the waveguide formed by aperture 206 through metallic material 204.

Dielectric plate 208 provides structural support to wall 202 and also protects enclosure 200 and its contents against environmental elements (e.g., rain, humidity, dust, etc.). Dielectric plate 208 maybe a conventional dielectric material such as quartz, boron nitride, silicon nitride, beryllium oxide, aluminum oxide, or glass and is transmissive and at least partially transparent (preferably, fully transparent) to visible light. Preferably, dielectric plate 208 is not opaque. In some embodiments, a second dielectric plate may be present on the other side of metallic material 204, thus forming a sandwich construction of metallic material 204 between two glass or dielectric plates 208. In most embodiments, the thickness of dielectric plate 208 is less than 10 times the thickness of metallic material 204.

Metallic plate 204 includes apertures 206 configured to allow the passage of RF and visible light therethrough. Apertures 206 may be referred to as waveguides, directing the passage of RF and visible light through metallic plate 204. RF energy, in general, has a frequency of 3 kHz to 300 GHz, which corresponds to a wavelength of 10 km to 1 cm. For most RF tracking systems, the RF frequency used is 0.4 to 7.2 GHz, which corresponds to a wavelength of 4 to 70 cm. Visible light includes wavelengths of about 390 to 700 nm, and near infrared (NIR) includes wavelengths of about 700 nm to 1 mm.

The frequency behavior of enclosure 200 can be designed by altering the shape, size and orientation of apertures 206 and also the thickness of metallic plate 204. Examples of suitable shapes for apertures 206 include circular, oval/elliptical, rectangular (including square), other polygonal, and irregular shapes. In most embodiments, all apertures 206 on container 200 or at least on wall 202 will have the same shape and size, although in some embodiments, the multiple shapes and/or sizes may be used to allow different wavelengths of energy to pass therethrough. Apertures 206 may be arranged in a regular, orderly pattern or may be randomly positioned. They may be arranged in parallel rows, with apertures in adjacent rows aligned to form columns orthogonal to the rows, or the rows may be offset.

In one embodiment, the aperture shape is circular, as shown in FIG. 4. A plurality of apertures 306 is shown, each having a diameter "d" equal to or less than half (½) the wavelength and more than quarter (¼) of the wavelength of the RF energy to be transmitted and/or received. This diameter "d" is both a length and a width or height for circular apertures 306. Apertures 306 in adjacent rows are spaced a distance "a" (between apertures centers) and apertures 306 in a row are spaced a distance "b" (between adjacent aperture centers), where both "a" and "b" are less than half (½) the wavelength of the RF energy to be passed. In this embodiment, apertures 306 form adjacent equilateral triangles, the centers of apertures 306 in adjacent rows/columns forming an angle "theta" (θ) of 60°, and thus "a" and "b" being equal. Particular examples of circular aperture patterns include: d=8 cm, a/b=16 cm, and theta=60 degrees, for RF energy having a wavelength of 33.31 cm; d=2.9 cm, a/b=5.85 cm, and theta=60 degrees, for RF energy having a wavelength of 11.71 cm; and d=1 cm, a/b=2 cm and theta=60 degrees, for RF energy having a wavelength of 4.16 cm.

Other embodiments of perforated metallic structures are provided in U.S. Patent Application Publication 2014/0018023 (Lee et al.), titled "Light and RF Transparent Enclosure for Use with Asset Tracking Device," the entire disclosure of which is incorporated herein by reference.

The perforated structure should have sufficient integrity so that the container conforms to National Aerospace Standard (NAS) NAS3610 and FAA Technical Standard Order (TSO) No. C90c; these specifications dictate the compression and rigidity strength of the container, in addition to the external and interface geometries of the container. International Air Transport Association (IATA) unit load device (ULD) Technical Manual, 20th edition, may also be used for operational specifications.

Thus, various embodiments of the POWER MANAGEMENT SYSTEM FOR AIRCRAFT CONTAINER TRACKING DEVICE are disclosed. The implementations described above and other implementations are within the scope of the following claims. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A wireless RF transmitter device, the transmitter device comprising:
   a GPS positioning element;
   an RF communication module having an RF operating frequency, the operating frequency having an operating wavelength;
   a machine vision sensor to collect curvature data related to surroundings of the transmitter device;
   a primary power source comprising a solar cell and a supercapacitor, the solar cell operably connected to the supercapacitor;
   a secondary power source comprising a battery, the secondary power source being a back-up power source; and
   a power management system operably connected to the primary power source and the secondary power source.

2. The wireless RF transmitter device of claim 1 wherein the primary power source and the secondary power source are electrically connected in parallel.

3. The wireless RF transmitter device of claim 1 further comprising a cellular communication module.

4. The wireless RF transmitter device of claim 1 further comprising an enclosure enclosing the communication module, the enclosure having at least one wall comprising a metallic plate having a pattern of apertures therethrough and a dielectric plate adjacent to the metallic plate, each of the apertures having a length and a width, with the apertures arranged in columns and rows, with adjacent apertures in a row having a spacing therebetween, and a spacing between centers of adjacent apertures in adjacent rows, wherein the apertures are shaped, sized and spaced to allow passage therethrough of the RF operating wavelength.

5. The wireless RF transmitter device of claim 4 wherein the apertures comprise circular apertures.

6. The wireless RF transmitter device of claim 5 wherein the circular apertures have a diameter that is no more than ½ of the operating wavelength and that is no less than ¼ of the operating wavelength.

7. The wireless RF transmitter device of claim 5 wherein the spacing between centers of adjacent apertures in a row and the spacing between centers of adjacent apertures in adjacent rows is less than ½ of the operating wavelength.

8. The wireless RF transmitter device of claim 5 wherein the centers of adjacent apertures in a row and the centers of adjacent apertures in adjacent rows form an equilateral triangle.

9. The wireless RF transmitter device of claim 1 wherein the RF communication module comprises a LTE module.

10. The wireless RF transmitter device of claim 1 further comprising a sensor array comprising at least one motion sensor and the machine vision sensor.

11. A wireless RF transmitter device, the transmitter device comprising:
    a GPS positioning element;
    a sensor array comprising at least one motion sensor and at least one machine vision sensor to collect curvature data related to surroundings of the transmitter device;
    an RF communication module and a cellular communication module, each configured to deactivate and activate based on data detected by the sensor array;
    a primary power source comprising a solar cell and a supercapacitor, the solar cell operably connected to the supercapacitor;
    a secondary power source comprising a battery, the secondary power source being a back-up power source; and
    a power management system operably connected to the primary power source and the secondary power source.

12. The wireless RF transmitter device of claim 11 where the sensor array further collects motion data.

13. The wireless RF transmitter device of claim 11 where the sensor array further collects light data.

14. The wireless RF transmitter device of claim 11 wherein the RF communication module comprises a ZigBee/WiFi module.

15. A wireless RF transmitter device, the transmitter device comprising:
    a GPS positioning element;
    an RF communication module having an RF operating frequency, the operating frequency having an operating wavelength;
    a primary power source comprising a solar cell and a supercapacitor;
    a secondary power source comprising a battery;
    a power management system operably connected to the primary power source and the secondary power source; and an enclosure having the communication module therein, the enclosure having at least one wall comprising a metallic plate having a pattern of apertures therethrough and a dielectric plate adjacent to the metallic plate, each of the apertures having a length and a width, with the apertures arranged in columns and rows, with adjacent apertures in a row having a spacing therebetween, and a spacing between centers of adjacent apertures in adjacent rows, wherein the apertures are shaped, sized and spaced to allow passage therethrough of the RF operating wavelength.

16. The wireless RF transmitter device of claim 15 wherein the apertures comprise circular apertures.

17. The wireless RF transmitter device of claim 15 wherein the circular apertures have a diameter that is no more than ½ of the operating wavelength and that is no less than ¼ of the operating wavelength.

18. The wireless RF transmitter device of claim 15 wherein the spacing between centers of adjacent apertures in a row and the spacing between centers of adjacent apertures in adjacent rows is less than ½ of the operating wavelength.

19. The wireless RF transmitter device of claim 15 wherein the centers of adjacent apertures in a row and the centers of adjacent apertures in adjacent rows form an equilateral triangle.

* * * * *